Dec. 12, 1961 H. ERDMANN 3,012,313
RETAINING-RING ASSEMBLY TOOLS
Filed Aug. 21, 1959 3 Sheets-Sheet 1
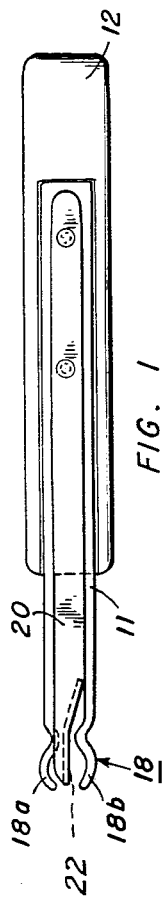
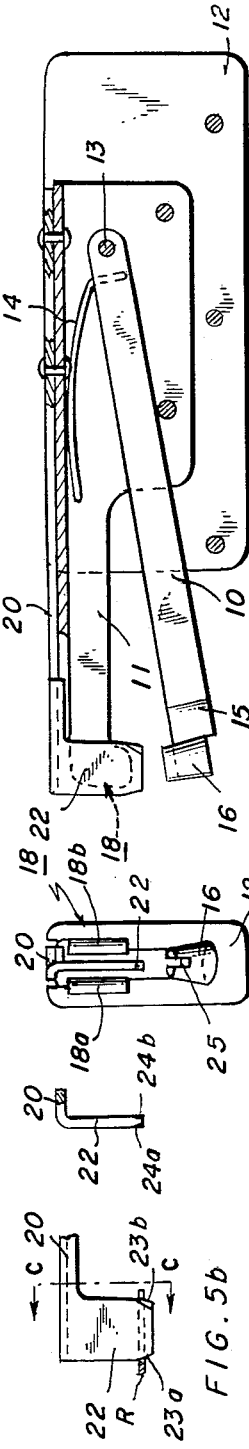
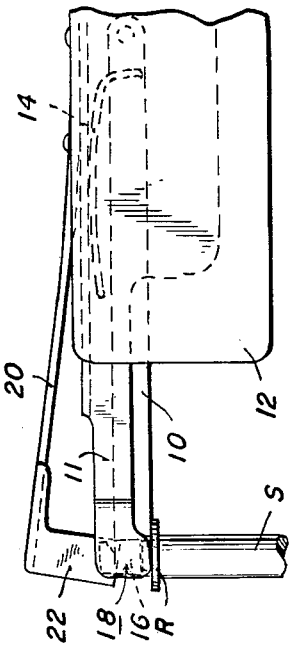
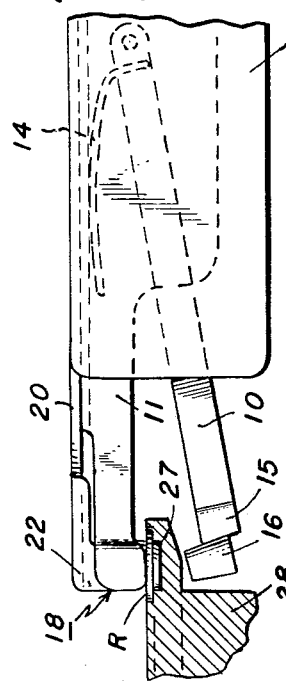
INVENTOR
HANS ERDMANN
BY *[signature]*
ATTORNEY

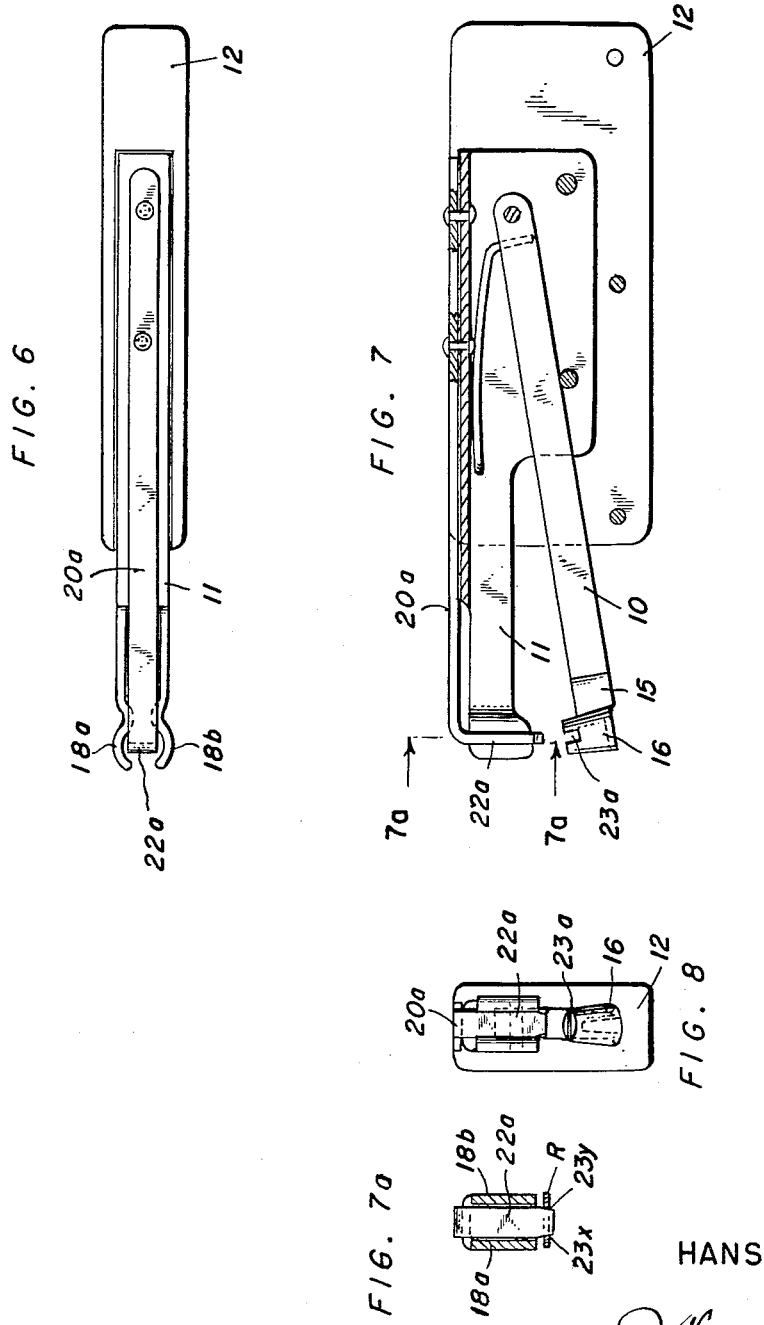

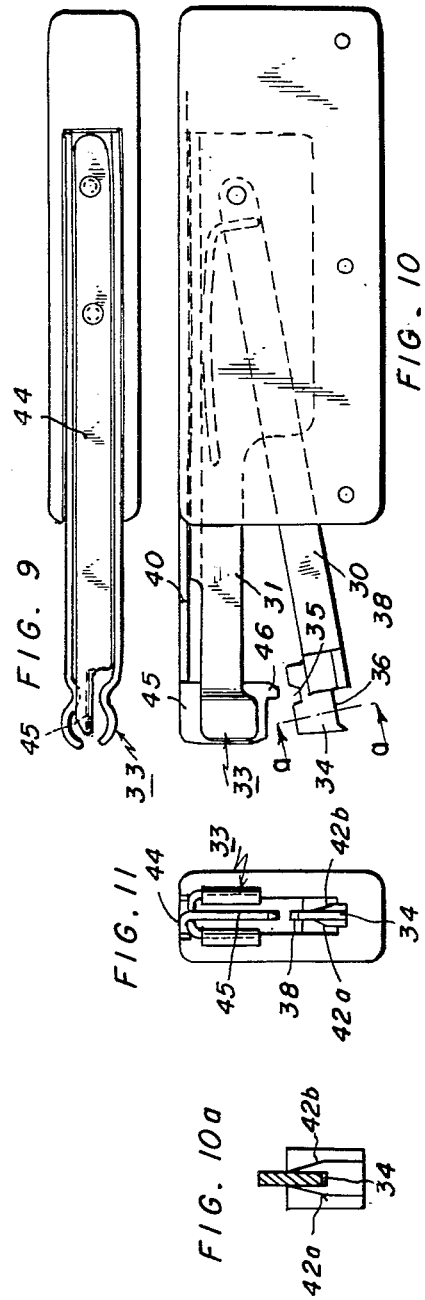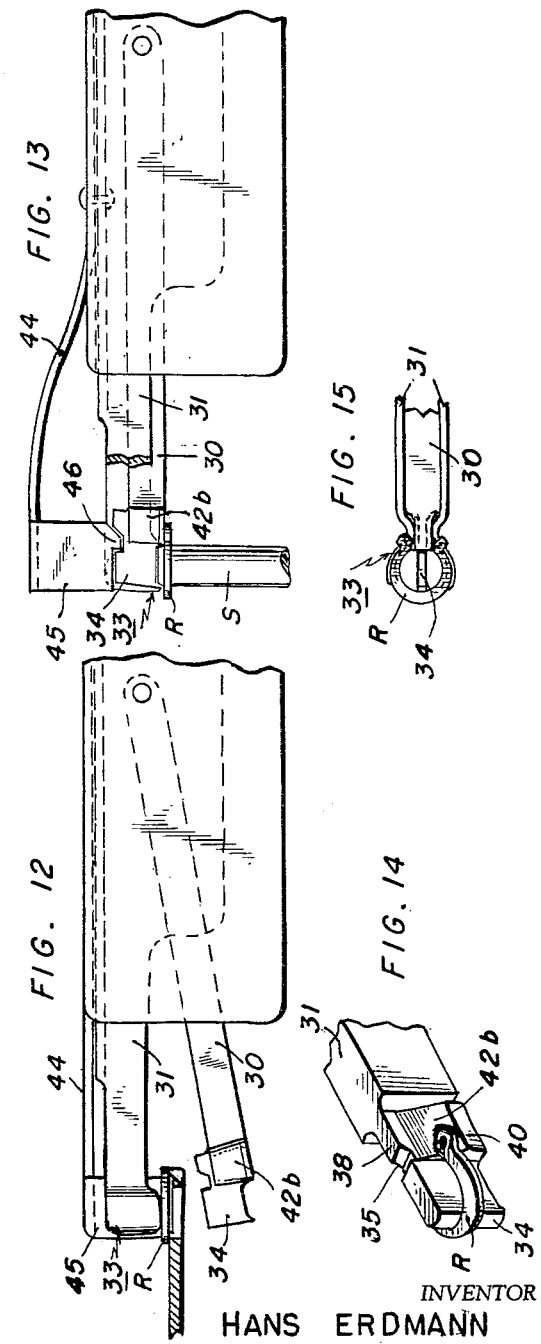

3,012,313
RETAINING-RING ASSEMBLY TOOLS
Hans Erdmann, Maplewood, N.J., assignor to Waldes Kohinoor, Inc., Long Island City, N.Y., a corporation of New York
Filed Aug. 21, 1959, Ser. No. 835,222
15 Claims. (Cl. 29—229)

This invention relates to improvements in retaining-ring assembly tools and is more particularly directed to an improved pliers-form tool for assembling split spring retaining rings on grooved shafts, pins, and like cylindrical workpieces or carrying members, of the general type disclosed and claimed in my prior application Serial No. 817,668, filed June 2, 1959.

Such a retaining-ring assembly tool comprises a pair of pivotally interconnected arms whose corresponding working ends, which are movable towards and away from one another in a common plane similarly to the working ends of conventional pliers, mount or are formed as a frusto-conical ring-spreading head and a generally annular ring push head, respectively, which are constructed and arranged so as, with closing movement of the arms, to spread a spring retaining ring having a free or unstressed inner-edge diameter somewhat less than that of the workpiece, and which has been operatively positioned on one end of the spreading head, axially therealong thereby to spread said ring to a diameter corresponding substantially to that of the workpiece. Such a tool is also capable of transferring the spread ring directly to the workpiece and of shifting it axially therealong to the plane of the groove, in which it springseats itself upon reaching the same.

While with the tool according to my prior application aforesaid it was possible to manually place a retaining ring to be assembled on the usually smaller-diameter ring-receiving end of the spreading head, such head end was preferably provided with a chamfer which slightly reduced the diameter of said end by an amount such that, when said ring-receiving end was pressed into the opening of the ring to be assembled laid flat on a horizontal supporting surface, for example, the tool was enabled to pick up the ring by virtue of the latter frictionally gripping the chamfered end portion of said spreading head. However, since in the normal position of the tool the spreading head is disposed beneath the push head, as also results in the chamfered ring-receiving end of said head being disposed upwardly, use of the tool to pick up the ring to be assembled by pressing the chamfered end of the ring spreading head into the ring opening necessitated the tool being turned bodily 180° from its normal position, and thereupon returned (by again turning it 180°) to its normal position in which it becomes operative to spread and apply the ring to a shaft or the like which is usually vertically held or positioned with its grooved ring-receiving end upwardly disposed.

The practical necessity of manually inverting the prior tool so as to enable it to pick up a ring to be assembled, and thereafter of turning it right side up, all preliminary to the actual ring assembly operation, of course slowed down the latter and additionally rendered the handling of the tool somewhat awkward. Also, the required inverting and uprighting operations run counter to present day endeavor to avoid any unnecessary manual movement on the part of the operator. Thus, there arose the problem of devising an effective tool of the type under consideration which would be capable both of picking up a ring to be assembled and of being held in the same position throughout the entire sequence of ring-picking up and assembling operations, thus avoiding the necessity of twice turning the tool in picking up each ring to be assembled according to my application aforesaid.

Stated broadly, an object of this invention is the provision of a pliers-type tool for assembling split spring retaining rings which possess the numerous advantages of the tool disclosed in my application Serial No. 817,668, but which is further so constructed and arranged as to make unnecessary the heretofore manual operations of inverting the tool in picking up a ring to be assembled and of thereafter righting said tool, preliminary to the actual ring-assembly operation, as characterized my prior tool.

More particularly, it is an important object of this invention to provide, in a pliers-type split spring retaining ring assembly tool of the type generally disclosed in my prior application aforesaid, ring pick-up means which is effective to grippingly engage a ring to be assembled when the tool is held in its normal upright position.

A further object of the invention is the provision of a pliers-type tool for assembling split spring retaining rings which incorporates ring pick-up means associated with the ring push head, rather than with the ring spreading head as aforesaid, and wherein said ring pick-up means comprises a blade-like part which extends axially through the opening in the push head from the side thereof opposite the ring spreading head and which, with movement of the tool arms towards one another, is adapted to enter the opening of a ring to be assembled and thereupon to grippingly engage said ring along its inner edge and in position such that the push head may push the same onto the ring spreading head, all prior to the push head engaging said ring.

Yet another object of the invention is a provision of a pliers-type tool for assembling split spring retaining rings incorporating ring pick-up means associated with the ring push head as aforesaid, wherein said ring pick-up means comprises a blade-like part adapted to move axially diametrically into the opening of the ring to be assembled and thereupon to engage said ring along its inner edge with the necessary friction as to temporarily secure the ring thereto, without however in any way interfering with the normal ring-spreading and applying functions of the tool as a whole.

Still another object of the invention is the provision of a pliers-type tool incorporating ring pick-up means as last aforesaid, wherein said blade-like part is extended in the direction of the ring gap and has width and thickness sufficient both to enter said gap and to assist in spreading the ring by its engagement with the edges of the ring which define the gap.

The above and other objects and advantages of a pliers-type tool for assembling split spring retaining rings according to the present invention will appear from the following detailed description thereof, taken with the following illustrative drawings showing preferred and modified forms of such a tool, wherein:

FIG. 1 is a top plan view of the preferred form of such a tool;

FIG. 2 is a side elevation thereof, partly in section;

FIG. 3 is front end view of said tool;

FIG. 4 is a broken away side elevational view corresponding to FIG. 2 which shows the tool in the process of picking up a ring to be assembled from a horizontal supporting surface, which may be a part of a ring dispenser;

FIG. 5 is a view similar to FIG. 4 showing the tool just after it has completed the assembly of the ring in the workpiece groove consequent to movement of the tool arms to their full closed position;

FIG. 5a is a detail view illustrating the manner in which the ring pick-up blade is adapted to enter a ring to be assembled and to grip same on its inner and gap edges;

FIG. 5b is a bottom view of FIG. 5a;

FIG. 5c is a section taken along line c—c of FIG. 5a which illustrates the chamfering of the lower edge portion of the blade as facilitates its entry into the opening of the ring and/or its gap;

FIGS. 6, 7 and 8 are views corresponding generally to FIGS. 1, 2 and 3 which illustrate a somewhat modified form of ring gripping means, with FIG. 7a being a section taken along line a—a of FIG. 7; and FIGS. 9–15 inclusive illustrate yet another form of split spring retaining ring assembly tool according to present invention, of which FIGS. 9–13 correspond to FIGS. 1–5, respectively, FIG. 14 is an enlarged broken-away perspective view of the working end of the arm carrying the ring spreading head, and FIG. 15 is a broken-away bottom view of said working end.

Referring to the drawings in detail and more particularly to FIGS. 1–5c, the tool form therein illustrated, except for the improvements to be hereinafter explained, corresponds in all substantial respects with the tool disclosed in my aforesaid application Serial No. 817,668. More particularly, said tool comprises a pair of pivotally related companion arms 10, 11, of which the arm 11 is affixed at its relatively rearward end to a block-like member serving as a tool handle 12 and arm 10 is pivotally connected at its corresponding rearward end to said handle as by a pivot pin 13 so that its other or working end projects therefrom in generally parallel relation to the relatively fixed arm 11. Said arms 10, 11 are normally biased to a spread-apart position by means of a spring 14 reactive against the under side of arm 11, which is preferably of downwardly-opening channel construction, as best seen in FIG. 2, but are adapted to move towards one another to a so-called closed position shown in FIG. 5.

At its free or working end, the lower arm 10 mounts through an intermediate connecting neck 15 a frusto-conical spreading head 16 arranged with its axis generally normal to said arm and with its smaller-diameter end upwardly disposed. Preferably, said smaller-diameter end has diameter corresponding substantially to the inner-edge diameter of a ring R to be assembled in its free or unstressed state, and the head tapers to its larger diameter end which has diameter corresponding substantially to the diameter of the shaft or other workpiece on which the ring is to be assembled. It will be understood that the axial length of the aforesaid spreading head is such as to insure a gradual, controlled spreading of the ring to be assembled as it is to be moved axially along same.

Telescopically related to the aforesaid ring spreading head 16 is a ring push head generally designated 18 carried at the other or working end of the companion upper arm 11. Said push head 13 is preferably comprised by arcuate bifurcations 18a, 18b having limited relative flexibility in which said upper arm 11 terminates, the bifurcations together forming a generally annular head member of diameter corresponding to the mean diameter of the ring to be assembled, that is, a diameter intermediate the inner and outer edges of the latter. Because of its generally annular formation and aforesaid diameter, the push head is adapted to engage against a face of such ring upon the latter being placed on the smaller diameter end of the spreading head 16 and thereupon, responsive to closing movement of the tool arms 10 and 11, to push it axially therealong, thus to affect spreading of the ring to an internal diameter corresponding substantially to that of the shaft or workpiece on which it is to be assembled. As seen in FIG. 5, the tool is also adapted to be held during the assembly operation with the larger diameter end of its spreading head 16 engaged tight against the end face of the shaft S or other workpiece on which the ring assembly is to be effected. Thus, the tool may be operated in manner as to push the spread ring over the end of said shaft S to the plane of the groove in which said ring is to seat, wherein it seats itself when free to do so.

According to the invention, the tool arm 11 also mounts ring gripping means effective to grip a ring to be assembled with sufficient force as to enable the tool to pick same up from a horizontal supporting surface, or from a ring positioning recess, which latter may be that of a ring dispenser as is indicated in FIG. 4. More particularly, said ring pick-up means preferably comprises a strap-form member 20 secured flush against the upper face of the arm 11 at its end remote from the push head 18, and terminating at its other or free end in a downwardly depending finger- or blade-like end 22 which extends axially through the opening of the annular push head 18 to a level slightly below the bottom edge line of said head. By providing said blade-like end with width somewhat greater than the inner edge diameter of a ring to be assembled, it is adapted, when pressed into the ring opening, to frictionally grip the ring along diametrically opposed points of its inner edge with sufficient holding power as to pick up the ring and hold it in position so that it can be acted upon by the ring push and ring spreading heads 16, 18 upon movement of the tool arms 10 and 11 towards one another.

To facilitate entry of the blade-like end 22 into the ring opening, its side edges may be slightly beveled as indicated at 23a, 23b. Also, said blade-like end 22 may be provided with extra width (dimension between side-edges) as enable its relatively rearward side-edge portion to move into the gap between the open ends of the ring. This extended end portion may have chamfered side faces 24a, 24b and sufficient thickness between that it is capable of exercising some limited spreading action of the ring engaged thereby along its gap edges. It is also possible, by proper dimensioning and configuring of said blade-like end 22, to secure substantial spreading of a ring consequent to said end moving into the gap between its open ends, as may make unnecessary the provision of a frusto-conical spreading head 16 as illustrated.

To insure against closing movement of the tool arms 10 and 11 being impeded by movement of the lower edge of the blade-like end 22 against the smaller-diameter end fact of the aforesaid spreading head 16, such end face is preferably longitudinally slotted to receive said lower edge, such slot being indicated as 25, FIG. 3. The depth of the slot in relation to the axial dimension of the blade-like end 22 is such as to provide the amount of closing of the tool arms 10, 11 as assures transference of the ring gripped by the blade-like end 22 to the spreading head, with full seating of said blade-like end in said slot.

The likelihood of the blade-like end 22 interfering with the closing movement of the arms 10 and 11 is further avoided by fashioning the strap member 20 of flexible material. Thus, upon the blade-like end 22 engaging in the slot 25 of the spreading head 16, continued closing movement of the said arm merely results in the free end of the strap-like member 20 flexing to a raised, inactive position illustrated in FIG. 5 without in any way impeding the desirable full closing movement of the arms as also shown in this figure.

The operation of the aforesaid improved tool is briefly as follows: Assuming that a ring R to be assembled is seated in a recess 27 provided therefor in the horizontal shelf or ledge 28 of a dispensing apparatus as shown in FIG. 4, the tool held normally and with arms spread is moved to a position in which the push head 18 and its associated blade-like end 22 is disposed directly above said ring, which will of course be properly oriented so that its gap is aligned with the neck 15 of the lower arm 10. Thereupon the arm 11 is lowered slightly, such resulting in said blade-like end 22 entering the ring opening and gap, as illustrated in FIG. 5a and making gripping engagement with both ring inner edge and gap edges. It will be observed that this gripping engagement of the blade-like end 22 and ring R takes place prior to the push head 18 moving against the upper face of the ring.

With the ring now frictionally held to the blade-like end 22, the tool many be raised from the supporting surface and bodily moved to a position over the shaft S on which ring assembly is to be effected. Upon properly relating the spreading head 16 of the tool with the upper end of said shaft, the tool arms are forcefully moved towards one another. This movement first moves the ring held by the blade 22 onto the smaller-diameter end of the spreading head, thereafter moves said ring axially therealong as affects its spreading to the diameter of the shaft 3, and finally pushes the now spread ring axially over the end of the shaft to the plane of the groove into which the ring spring-seats itself upon reaching same. During the course of aforesaid arm-closing movement, the blade-like end 22 in the first instance seats in the slot 25 provided therefor in the upper end face of the spreading head 16, and thereafter the strap carrying said blade-like end flexes upwardly as shown in FIG. 5, so that the provision of the latter in nowise interferes with the closing movement of the tool arms as aforesaid.

FIGS. 6–8 inclusive illustrate a somewhat modified version of the ring assembly tool just described. In the modified version, the strap 20a constituting the ring gripping means terminates at its free end in a blade-like end 22a which extends diametrically and transversely across the ring opening into which it enters. The width of said blade-like end 22a is necessarily such that its side edges make firm frictional engagement with the inner edge of the ring to be assembled, and entry of said blade 22 into the ring opening may be simply facilitated by beveling the side edges of the blade-end, as indicated at 23x, 23y (FIG. 7a). As seen in FIG. 7, the slot 23a formed in the upper end of the spreader head 16 is transversely disposed to accommodate the transverse disposition of said blade-like end 22a.

In the embodiment of FIGS. 9–15, the same general organization of tool arms 30, 31 characterizing the prior tool forms is employed, and the upper arm carries or mounts a generally annular push head 33, similar to the push head of said prior forms. However, the spreading head 34 employed in the modified tool, rather than having a frusto-conical formation, instead has substantially rectangular plate or bar form, being provided in its upper edge with a notch or slot 35 corresponding to the aforesaid blade-end receiving slot 25 or 25a, and in its bottom edge with a recess 36 adapted to receive the end of the shaft S on which ring assembly is to be effected, all as best seen in FIGS. 10 and 14. By reference to FIGS. 10a and 14, it will be observed that the neck 38 connecting the plate-form spreader head 34 with its carrying arm 30 is formed with a narrow-width top-edge portion and with a bottom portion which has gradually increasing thickness, consequent to its being formed with diverging side surfaces indicated at 42a, 42b. This gradually increasing thickened portion of the neck is spaced rearwardly from the forwardmost edge of the spreading head 34 a distance such as to be affective on the end lugs of the ring R into which the open ends of conventional retaining rings are shaped. Thus, as a ring is forced downwardly along the said spreading head 34 by the action of the push head 33 thereagainst, the inner sides of the ring end-lugs, which initially move freely downwardly along the narrow-width upper edge portion of the neck, gradually engage the diverging side face-portions 42a, 42b of said neck, with the result that the ring is effectively spread as it moves axially therealong. By proper dimensioning of said face-portions 42a, 42b, the ring can be easily spread to the diameter of the shaft S on which its assembly is to be effected.

The modified tool of FIGS. 9–15 is a course provided with the ring gripping means characterizing the instant invention. As heretofore, such comprises a strap-form member 44 affixed on the upper side of the push-head carrying arm 31, and having a depending finger- or blade-like end 45 which extends axially through the opening of the push head and normally terminates at a level somewhat below the lower edge line of said push head, thus to be capable of moving into the opening of the ring to be assembled and to frictionally engage the inner edge thereof prior to the lower edge of the push head moving into face engagement with the ring with closing movement of the tool arms. Since the spreading head 34 has approximately the same thickness as a ring-gripping blade 45, said head is not slotted to receive the full width of said blade, as with the frusto-conical heads of the prior described tool forms. However, to properly relate the ring-gripping blade 45 with the spreading head, said gripping blade is provided at its lower rearward corner with a spur 46 which fits into the aforesaid notch 35 provided in the upper edge of the combined spreader head-neck parts.

Despite its modified spreader head, the tool of the FIGS. 9–15 embodiment operates in the same general manner as the prior described tool forms. That is to say, the tool held in its normal or right-side up position is moved against a ring to be assembled positioned on a flat supporting surface or in the recess provided therefor in a dispenser, as in FIG. 12, and the ring-gripping blade 42 is engaged therewith, such resulting in the tool picking up the ring and positioning it immediately over the spreading head 34. The tool with ring held thereto is now moved over the shaft S on which the ring assembly is to be effected, and consequent to closing movement of the tool arms, the ring is spread to the diameter of the shaft and moved over the shaft end to the plane of its groove, just as with the previously described tool forms. It will be understood that because of the flexibility of the strap member 40 from which its ring-gripping blade-like end 42 extends, the latter upon engaging against the spreading head may flex to an out-of-the-way raised position as in FIG. 13, and thus the ring-gripping means of the invention functions without interfering in any way with the normal operation of the tool in spreading a ring to the diameter of the shaft on which it is to be assembled and thereupon shifting it over the shaft end to the plane of its groove.

Without further analysis, it will be appreciated that a tool according to the various forms thereof described above satisfies the major objective of the invention of devising a tool for assembling split spring retaining rings that is capable of picking up a ring to be assembled and thereupon of performing the assembly operation for which it is designed, without any requirement of first inverting the tool in order to pick up the ring and thereafter righting it, all prior to the ring spreading and applying operations. Thus, the tool of the invention not only greatly speeds up a ring assembly operation, as compared to the tool of my prior application aforesaid, but also it greatly simplifies such operation in that it reduces the number of manual movements which the operator is required to make in the performance thereof.

As many changes may and can be made in carrying out the above tool constructions without departing from the scope of the invention, it is intended that all matter contained in the foregoing description or shown in the accompanying drawings shall be interpreted as illustrative and not in a limiting sense.

I claim:

1. In a pliers-type tool for assembling split spring retaining rings on grooved shafts and like cylindrical workpieces including pivotally interconnected arm members having corresponding working ends movable toward and away from one another, the working end of one arm carrying a ring spreading head and the working end of the other arm carrying ring pushing means adapted to telescope over said spreading head comprising arcuate bifurcations together defining a generally annular push head having an effective diameter approximately equal to the mean diameter of the ring being assembled and a working edge adapted to engage against a face of the ring disposed between said working ends with movement of said arms toward one another, the improvement comprising ring pick-up means operatively connected to said other arm and projecting axially through the opening of said push head and normally beyond said working edge and adapted to frictionally engage the inner edge of said ring immediately prior to movement of said push head into engagement with said ring face, thereby enabling the tool to pick up the ring to be assembled.

2. The improvement in a pliers-type tool for assembling split spring retaining rings as set forth in claim 1, wherein said ring pick-up means comprises a strap-form member affixed to the relatively upper side of said other arm and terminating in a depending blade-like end portion which normally projects axially through the opening in the push head as aforesaid, said blade-like end portion extending diametrically across said opening and adapted to grippingly engage the inner edge of said ring.

3. The improvement in a pliers-type tool for assembling split spring retaining rings as set forth in claim 2, wherein said strap-form member is connected to said other arm adjacent the end thereof opposite said blade-like end portion, whereby the latter end is free to flex relatively to said push head.

4. The improvement in a pliers-type tool for assembling split spring retaining rings as set forth in claim 1, wherein said ring pick-up means comprises a strap-form member affixed to the relatively upper side of said other arm and terminating in a depending blade-like end portion which projects axially through the opening in the push head as aforesaid and is disposed to extend diametrically across said opening on a transverse diameter thereof, the width of said blade-like end portion corresponding substantially to the inner-edge diameter of said ring.

5. The improvement in a pliers-type tool for assembling split spring retaining rings as set forth in claim 1, wherein said ring pick-up means comprises a strap-form member affixed to the relatively upper side of said other arm and terminating in a depending blade-like end portion which projects axially through the opening in the push head as aforesaid and is disposed to extend longitudinally with respect to said arm.

6. The improvement in a pliers-type tool for assembling split spring retaining rings as set forth in claim 5, wherein the blade-like end portion has extended width such that it is adapted to also enter the gap between the open ends of the ring being assembled.

7. The improvement in a pliers-type tool for assembling split spring retaining rings as set forth in claim 1, wherein said ring pick-up means comprises a strap-form member affixed to the relatively upper side of said other arm and terminating in a depending blade-like end portion which projects axially through the opening in the push head as aforesaid, the lowermost end of said blade-like end portion having width between side edges which increases progressively from a figure which is slightly less than the inner-edge diameter of the ring to a figure which is slightly greater than the said diameter.

8. The improvement in a pliers-type tool for assembling split spring retaining rings as set forth in claim 2, wherein the lowermost edge of the blade-like end portion is chamfered to facilitate its entry into the ring opening.

9. A pliers-type tool for assembling split spring retaining rings on grooved shafts, pins and like cylindrical workpieces comprising, in combination, a pair of pivotally interconnected arms having corresponding handle and working ends, of which the working ends are movable toward and away from one another in a common plane, the working end of one arm including a ring spreading head connected by a neck to the arm proper for spreading a ring to be assembled which latter has an unstressed inner-edge diameter less than that of the workpiece to an internal diameter corresponding substantially to that of the workpiece diameter responsive to axial movement of the ring along said head, the working end of said other arm having ring pushing means comprising arcuate bifurcations together defining a generally annular push head having a diameter substantially equal to the mean diameter of the ring to be assembled and being adapted to engage against the face of such a ring positioned between said working ends with movement of said arms and their working ends towards one another and thereupon to push said ring along said spreading head so as to spread the same, and ring pick-up means operatively connected to said other arm and projecting axially through the opening in the push head in the direction of said spreading head, said ring pick-up means being adapted to grippingly engage the inner edge of the ring prior to said push head making face engagement therewith as aforesaid responsive to movement of said arm working ends towards one another.

10. A pliers-type tool for assembling split spring retaining rings as set forth in claim 9, wherein said ring pick-up means comprises a strap-form member affixed to the relatively outer side of said other arm and terminating in a blade-like end portion which projects axially into the opening of said push head as aforesaid to a position in which it is adapted to grippingly engage the inner edge of a ring with initial movement of said working ends towards one another.

11. A pliers-type tool for assembling split spring retainings rings as set forth in claim 9, wherein said ring pick-up means comprises a strap-form member affixed to the relatively upper side of said other arm and terminating in a blade-like end portion which projects axially through the opening in the push head as aforesaid, said strap-form member being affixed to said other arm only at its end opposite the end forming the blade-like end portion whereby said latter end may flex relatively away from said push head upon movement of said blade-like end portion against the spreading head.

12. A pliers-type tool for assembling split spring retaining rings as set forth in claim 9, wherein the ring pick-up means comprises a strap-form member affixed to the upper side of said other arm adjacent its one end and its other end depends as a blade through the axial opening of said push head, the end of the ring spreading head adjacent the push head being provided with a slot adapted to receive the blade upon the latter moving thereagainst.

13. A pliers-type tool for assembling split spring retaining rings as set forth in claim 12, wherein said blade has width corresponding substantially to that of the inner edge of the ring and extends diametrically across the ring opening.

14. A pliers-type tool for assembling split spring retaining rings as set forth in claim 9, wherein said ring pick-up means includes a blade carried by said other arm extending axially through the opening of the push head and adapted to enter the opening of the ring to be assembled, said blade being extended in the direction of said arm carrying same so as also to enter the gap between the open ends of the ring.

15. A pliers-type tool for assembling split spring retaining rings as set forth in claim 9, wherein said ring spreading head has frusto-conical shape and is disposed with its smaller diameter end adjacent to the ring push head and said pick-up means includes a blade which projects beyond the working end of said push head, the end face of said spreading head adjacent to said push head being provided with a diametrical slot positioned to receive the blade upon movement of the latter against said end face.

References Cited in the file of this patent
UNITED STATES PATENTS 2,510,206    Barkan et al. _____ June 6, 1950
2,641,148    Arthur _____ June 9, 1953